(12) United States Patent
Sun et al.

(10) Patent No.: US 11,047,801 B2
(45) Date of Patent: Jun. 29, 2021

(54) VIBRATION OPTICAL PATH ASSEMBLY AND LASER INDUCED BREAKDOWN SPECTOGRAPH HAVING SAME

(71) Applicant: VELA OPTOELECTRONICS (SUZHOU) CO., LTD., Jiangsu (CN)

(72) Inventors: Rong Sun, Zhangjiagang (CN); Wei Guo, Jiangsu (CN)

(73) Assignee: VELA OPTOELECTRONICS (SUZHOU) CO., LTD.

( * ) Notice: Subject to any disclaimer, the term of this patent is extended or adjusted under 35 U.S.C. 154(b) by 0 days.

(21) Appl. No.: 16/499,489

(22) PCT Filed: Mar. 2, 2018

(86) PCT No.: PCT/CN2018/077879
§ 371 (c)(1),
(2) Date: Dec. 16, 2019

(87) PCT Pub. No.: WO2018/177070
PCT Pub. Date: Oct. 4, 2018

(65) Prior Publication Data
US 2020/0132607 A1    Apr. 30, 2020

(30) Foreign Application Priority Data

Mar. 31, 2017    (CN) .......................... 201710209683.5

(51) Int. Cl.
*G01J 3/443*    (2006.01)
*G01N 21/71*    (2006.01)
(Continued)

(52) U.S. Cl.
CPC .......... *G01N 21/718* (2013.01); *G01J 3/0208* (2013.01); *G01J 3/443* (2013.01); *G02B 7/02* (2013.01); *G01N 2201/06113* (2013.01)

(58) Field of Classification Search
CPC .......... G01N 21/718; G01N 2201/0221; G01J 3/443; G01J 3/0256; G02B 7/02
See application file for complete search history.

(56) References Cited

U.S. PATENT DOCUMENTS 4,794,586 A    12/1988    Korth
5,224,088 A *   6/1993    Atiya ................. G11B 7/003
                                                     235/454
(Continued)

FOREIGN PATENT DOCUMENTS

CN        2110998 U       7/1992
CN      101592784 A      12/2009
(Continued)

OTHER PUBLICATIONS

First Office Action regarding related CN App. No. 20170209683.5; dated Apr. 23, 2020.
(Continued)

*Primary Examiner* — Maurice C Smith
(74) *Attorney, Agent, or Firm* — Dickinson Wright PLLC

(57) ABSTRACT

The disclosure provides a vibration optical path assembly and a laser induced breakdown spectrograph have the same. The vibration optical path assembly includes an optical platform, a cantilever and an optical lens; the cantilever at least includes a vertical arm disposed at the optical platform and a cross arm disposed at the vertical arm, wherein at least one of the vertical arm and the cross arm is made of an elastic material; the vibration generating device, provided on the cantilever and configured to adjustably generate a first vibration; the optical lens, provided on the cantilever and configured for the light to pass through to form a light spot. The first vibration is transmitted to the optical lens through the cantilever to generate a second vibration, and the light is
(Continued)

passed through the optical lens with vibrating to generate a light spot movement phenomenon.

20 Claims, 7 Drawing Sheets

(51) Int. Cl.
  *G01J 3/02* (2006.01)
  *G02B 7/02* (2021.01)

(56) References Cited

U.S. PATENT DOCUMENTS

| | | | | |
|---|---|---|---|---|
| 5,377,048 | A * | 12/1994 | Tada | G02B 7/04 |
| | | | | 359/694 |
| 6,586,750 | B2 * | 7/2003 | Montagu | G01N 21/6452 |
| | | | | 250/458.1 |
| 7,129,472 | B1 | 10/2006 | Okawa et al. | |
| 2004/0081039 | A1 * | 4/2004 | Naraoka | G11B 7/0956 |
| | | | | 369/44.32 |
| 2004/0122328 | A1 * | 6/2004 | Wang | A61B 1/00167 |
| | | | | 600/476 |
| 2005/0030553 | A1 | 2/2005 | Akishiba | |
| 2010/0177623 | A1 * | 7/2010 | Ito | G11B 7/0933 |
| | | | | 369/112.23 |
| 2012/0044488 | A1 | 2/2012 | Senac | |
| 2014/0285712 | A1 * | 9/2014 | Kim | H04N 5/2252 |
| | | | | 348/373 |
| 2016/0069745 | A1 | 3/2016 | Wang et al. | |
| 2017/0139163 | A1 * | 5/2017 | Sandhu | G02B 6/32 |

FOREIGN PATENT DOCUMENTS

| | | |
|---|---|---|
| CN | 201804162 U | 4/2011 |
| CN | 10272208 A | 10/2012 |
| CN | 102722028 A | 10/2012 |
| CN | 103063872 A | 4/2013 |
| CN | 103674839 A | 3/2014 |
| CN | 105067571 A | 11/2015 |
| CN | 105277497 A | 1/2016 |
| CN | 105573037 A | 5/2016 |
| CN | 106125314 A | 11/2016 |
| CN | 206876582 U | 1/2018 |
| WO | 2013083950 A1 | 6/2013 |

OTHER PUBLICATIONS

Extended European Search Report regarding corresponding EP App. No. 18777254.6; dated Oct. 12, 2020.

* cited by examiner

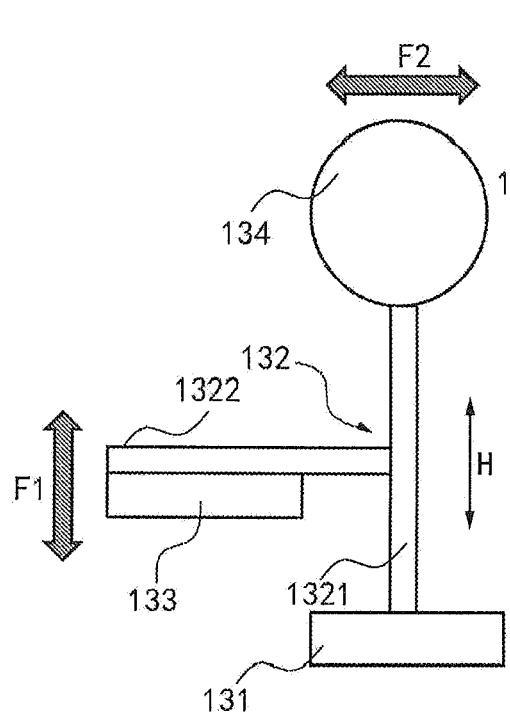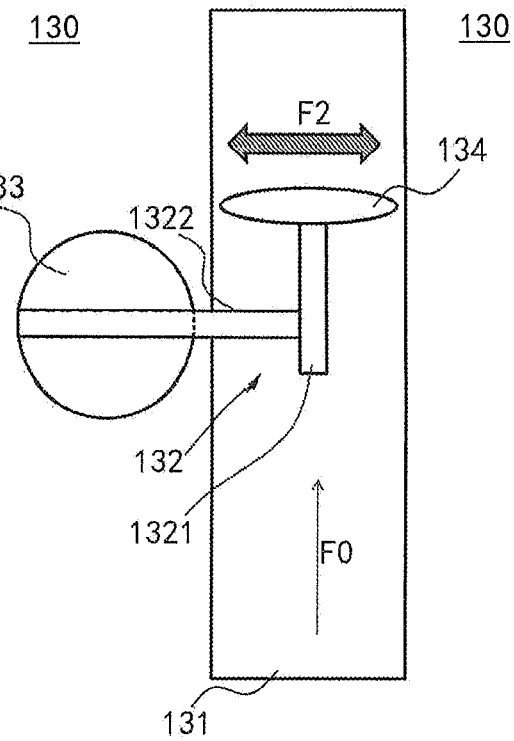
Fig.5    Fig.6
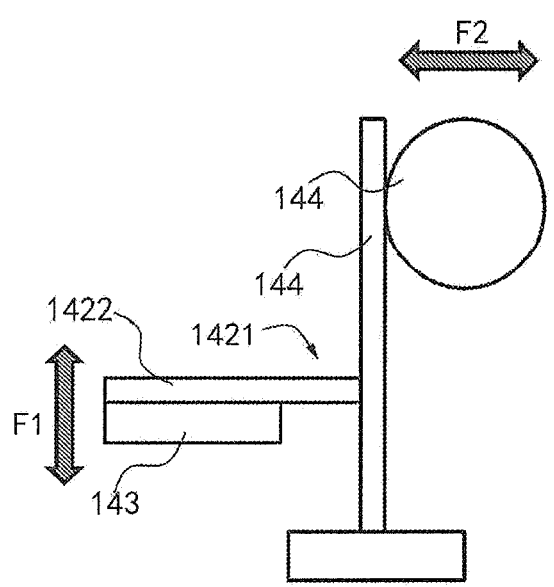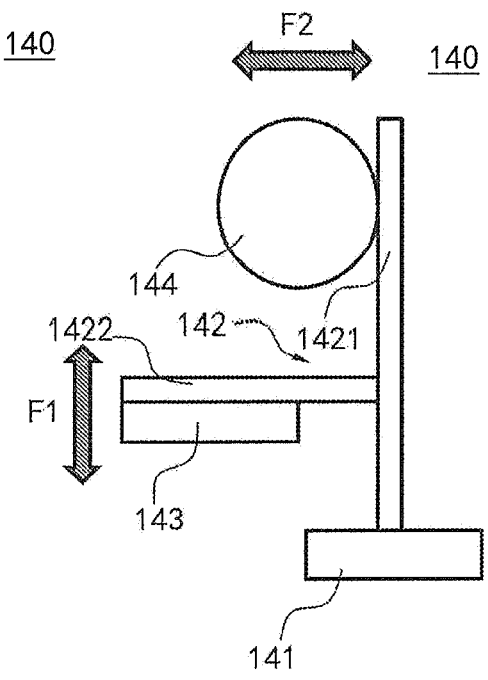
Fig.7    Fig.8

VIBRATION OPTICAL PATH ASSEMBLY AND LASER INDUCED BREAKDOWN SPECTOGRAPH HAVING SAME

CROSS REFERENCE

The present application is a continuing application of International Application No. PCT/CN2018/077879, filed on Mar. 2, 2018, which is based upon and claims priority to Chinese Patent Application No. 201710209683.5, filed on Mar. 31, 2017, and the entire contents thereof are incorporated herein by reference.

TECHNICAL FIELD

The present disclosure relates to the field of spectral analysis technology, and in particular to an assembly for vibration optical path and a spectrograph having the same.

BACKGROUND

Laser Induced Breakdown Spectroscopy (LIBS) is an emerging analytical tool in the field of spectroscopic analysis. The principle of an existing laser induced breakdown spectrograph is generally summarized as an analytical method for qualitative and quantitative analysis of the composition of a substance to be tested based on atomic emission spectroscopy. Wherein the above substance to be tested may be solid, liquid or gaseous. For example, when the substance to be tested is solid, a high-energy pulsed laser is focused on a surface of the solid substance to be tested by an optical method, and a small part of the substance to be tested is vaporized and peeled off to form plasma, that is, the substance to be tested in a plasma state. After the pulsed laser terminates emission, the substance to be tested in the plasma state is rapidly cooled, and electrons are released excess energy in the form of photons during a process of electrons moving back to a ground state. Based on the principle that emitted photon energies of different atoms are different, the above photons are collected by the spectrograph and split into their specific atomic emission spectra. Different characteristic peaks in the atomic emission spectra is corresponded to specific wavelengths, and a size of a characteristic peak is corresponded to a concentration of an element or an atom, which becomes the basis for qualitative and quantitative analysis.

Based on the above spectral analysis principle, those skilled in the related art have made some explorations and attempts on optical path design of the laser induced breakdown spectrograph, examples are as follows.

In the PCT International Application Publication No. WO2013083950, a solution for rotating the entire optical platform about a rotating axis by means of a reciprocating support is proposed to achieve a horizontal movement relative to the surface of the material. However, in the disclosed technical solution, since the optical platform is relatively heavy, the mechanical structure provided for pushing the optical platform has a large volume, and cannot achieve rapid reciprocating movement, but can only provide the optical platform a low-speed and one-direction translation function.

In U.S. Pat. No. 7,595,873, a technical solution based on one or two rotating reflectors for moving the position of the spot by different reflection angles is proposed. However, in its disclosed technical solution, limited by its design ideas, the reflectors are rotated at a relatively slow speed and required a complicated motor system to drive.

In U.S. Patent Publication No. US 20140198367, the technical solution for fixing an optical device on an XY stage and moving the spot through the translation of the platform is proposed. However, in its disclosed technical solution, rapid reciprocating motion cannot be achieved due to the size and weight of the platform.

In U.S. Pat. No. 8,436,991, the technical solution based on the design of the optical path of two parabolic cylindrical mirrors, one of which can be rotated, thereby realizing the movements of the foci of the light spots. The technical solution is similar to the technical solution of the patent publication No. U.S. Pat. No. 7,595,873, and the difference is that a reflecting surface is changed from a flat plane to a curved surface. Therefore, the reflector's rotational speed is still relatively slow and still requires a complex motor system to drive.

In U.S. Pat. No. 6,057,947, the technical solution for moving the optical path by tilting a reflector is proposed. The technical solution is similar to the technical solutions of the two patents disclosed in U.S. Pat. Nos. 7,595,873 and 8,436,991, and does not overcome the defects of the above technical solutions, and the structure is relatively complicated.

In summary, in the existing optical path design solutions for laser induced breakdown spectrograph, the mechanical structure required to achieve the movement of the light spot is large in volume, the moving rate is low, and high-frequency reciprocating movement cannot be achieved. In addition, the above technical solutions generally have the defects that the mechanism is complicated and the required driving power consumption is high.

Therefore, in the current miniaturization trend of laser induced breakdown spectrographs, such as the miniaturized hand-held laser induced breakdown spectrograph optical path design, the existing related optical path design solutions are unable to achieve fast reciprocating light spot movement, and cannot meet the requirements of miniaturization on the size and complexity of the mechanism.

SUMMARY

According to one aspect of the present disclosure, a vibration optical path assembly for light to pass through and forming a light spot is provided. The vibration optical path assembly includes an optical platform, a cantilever, a vibration generating device and an optical lens. The cantilever at least includes a vertical arm disposed at the optical platform and a cross arm disposed at the vertical arm, wherein at least one of the vertical arm and the cross arm is made of an elastic material. The vibration generating device is provided on the cantilever and configured to adjustably generate a first vibration. And the optical lens is provided on the cantilever and configured for the light to pass through to form a light spot. Wherein the first vibration is transmitted to the optical lens through the cantilever to generate a second vibration, and the light is passed through the optical lens with vibrating to generate a light spot movement phenomenon.

According to one of the embodiments of the present disclosure, the vertical arm is perpendicular to the optical platform; the cross arm is parallel to the optical platform; a top part of the vertical arm is connected to a middle position of the cross arm in an extending direction of the cross arm; the vibration generating device and the optical lens are respectively disposed at positions adjacent to two end parts of the cross arm; and the cross arm is made of the elastic material.

According to one of the embodiments of the present disclosure, the vertical arm is made of the elastic material.

According to one of the embodiments of the present disclosure, a light incident direction of the light is parallel to the optical platform is defined, directions of the first vibration and the second vibration are both perpendicular to the optical platform and perpendicular to the light incident direction, or directions of the first vibration and the second vibration both parallel to the optical platform and perpendicular to the light incident direction.

According to one of the embodiments of the present disclosure, the vertical arm is perpendicular to the optical platform; the cross arm is disposed at one side of the vertical arm and parallel to the optical platform; a light incident direction of the light is parallel to the optical platform is defined, the cross arm is perpendicular to the light incident direction; the optical lens is disposed at the vertical arm; and the cross arm and the vertical arm are made of elastic materials.

According to one of the embodiments of the present disclosure, a direction of the first vibration is perpendicular to the optical platform and perpendicular to the light incident direction, and a direction of the second vibration is parallel to the optical platform and perpendicular to the light incident direction.

According to one of the embodiments of the present disclosure, the optical lens is disposed at the top part of the vertical arm.

According to one of the embodiments of the present disclosure, the cross arm is disposed at the middle position of the vertical arm in a height direction of the vertical arm to which the cross arm is connected.

According to one of the embodiments of the present disclosure, the optical lens is disposed at a side of the vertical arm to which the cross arm is connected; or the optical lens is disposed at an opposite side of the vertical arm to which the optical lens is connected.

According to one of the embodiments of the present disclosure, the top part of the vertical arm is connected to the middle position of the cross arm in the extending direction of the cross arm, and the vibration generating device and the optical lens are respectively disposed at positions adjacent to the two end parts of the cross arm; wherein an titling angle is provided between the cross arm and the optical platform, and the cross arm is made of the elastic material.

According to one of the embodiments of the present disclosure, the vertical arm is made of the elastic material.

According to one of the embodiments of the present disclosure, the vertical arm comprises a first arm and a second arm which are perpendicular to the optical platform; the first arm is disposed at the optical platform; and the second arm is configured to adjustably move up and down relative to the first arm in a direction perpendicular to the optical platform; the second arm is connected to the middle position of the cross arm in the extending direction of the cross arm; the vibration generating device and the optical lens are respectively disposed at positions adjacent to the two end parts of the cross arm, and the cross arm is made of the elastic material.

According to one of the embodiments of the present disclosure, the first arm is provided with a first positioning structure, and the second arm is provided with a second positioning structure that is cooperated with the first positioning structure to locate the second arm and the second arm with each other when the second arm is adjusted to a different position relative to the first arm.

According to one of the embodiments of the present disclosure, the first arm and the second arm are respectively rotatable relative to each other.

According to one of the embodiments of the present disclosure, the cross arm incudes a body part and a connection part; the connection part is connected to the middle position of the body part in the extending direction of the body part and extended to the second arm; the body part of the cross arm is connected to the second arm via the connection portion.

According to one of the embodiments of the present disclosure, the vertical arm is provided with a third positioning structure, and the optical platform is provided with a plurality of sets of fourth positioning structures for positioning the vertical arm and the optical platform when the cantilever is adjusted to different positions of the optical platform.

According to one of the embodiments of the present disclosure, the vertical arm and/or the cross arm of the cantilever is/are designed as reeds.

According to one of the embodiments of the present disclosure, the vibration generating device is a button type vibration generator.

According to another aspect of the present disclosure, a laser induced breakdown spectrograph for spectral analysis of a substance to be tested is provided. The laser induced breakdown spectrograph includes a laser, an vibration optical path assembly, a spectrograph and a signal acquisition component. The laser is configured to emit a high energy pulsed lase. The vibration optical path assembly is provided between the laser and the substance to be tested to focus the high energy pulsed laser to the substance to be tested to form a light spot. The spectrograph is configured to receive photons generated by the high energy pulsed laser bombardment of the substance to be tested and perform spectral analysis. The signal acquisition component is provided between the substance to be tested and the spectrograph to collect photons to the spectrograph.

According to one of the embodiments of the present disclosure, the spectrograph is provided with an incident slit; positions of the incident slit and the light spot are corresponding to each other, and extending directions of the incident slit and the light spot are the same.

The above and other purposes, features and advantages of the present disclosure will be more apparent by the following description of preferred embodiments with reference to the accompanying drawings.

BRIEF DESCRIPTION OF THE DRAWINGS

FIG. 5 is a longitudinal view of a vibration optical path assembly according to still another exemplary embodiment;

FIG. 6 is a top view of the vibration optical path assembly shown in FIG. 5;

FIG. 7 and FIG. 8 are longitudinal views of a vibration optical path assembly according to still another exemplary embodiment;

DETAILED DESCRIPTION

Figure 1:
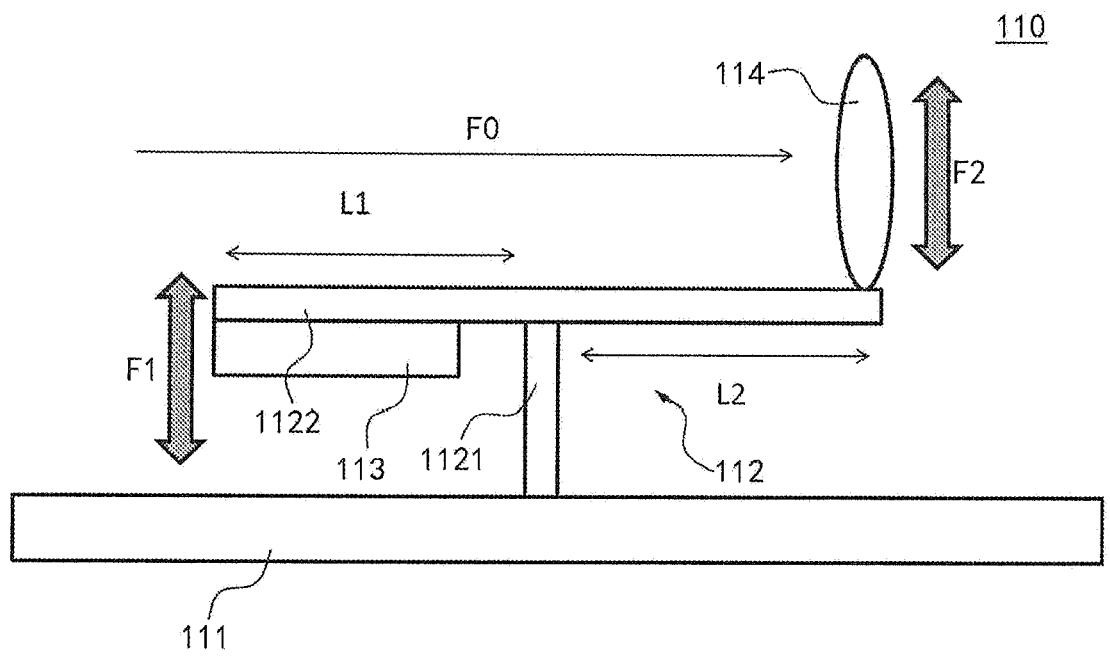
FIG. 1 is a side view of a vibration optical path assembly according to an exemplary embodiment.

Example embodiments will now be described more fully with reference to the accompanying drawings. Example embodiments can be embodied in many forms and should not be construed as being limited to the embodiments set forth herein. Rather, these embodiments are provided so that this disclosure will be thorough and complete, the same reference numerals in the drawings denote the same or similar structures, and thus their detailed description will be omitted.

The First Embodiment of a Vibration Optical Path Assembly

Referring to FIG. 1, FIG. 1 representatively shows a side view of a vibration optical path assembly according to an exemplary embodiment. In the exemplary embodiment, the vibration optical path assembly 110 proposed by the present disclosure is exemplified by a laser light transmission path forming a spectrograph. Further, the laser light transmission path between the laser and the substance to be tested forming a laser induced breakdown spectrograph (abbreviated as LIBS spectrograph) will be described as an example. It will be readily understood by those skilled in the art that the vibrating optical path assembly 110 is applied to other types of spectrographs, and various modifications, additions, substitutions, deletions, or other changes are made to the specific embodiments described below still follow within the scope of the principles of the vibrating optical path assembly 110 proposed by the present invention.

As shown in FIG. 1, in the present embodiment, the vibration optical path assembly 110 proposed by the present disclosure can be used for light to pass through and form a light spot, which mainly includes an optical platform 111, a cantilever 112, a vibration generating device 113, and an optical lens 114. In the embodiment, the cantilever 112 is disposed at the optical platform 111. The vibration generating device 113 and the optical lens 114 are respectively provided at the cantilever 112. And a first vibration generated by the vibration generating device 113 is transmitted to the optical lens 114 through the cantilever 112 to generate a second vibration, so that the light passing through the optical lens 114 is irradiated on the light spot on the surface of the substance to be tested to generate a light spot movement phenomenon. Coordinately referring to FIG. 2, a top view of the vibration optical path assembly 110 shown in FIG. 1 is representatively shown. The main components and functions of the vibration optical path assembly 110 in the present embodiment will be described in detail below with reference to FIG. 1 and FIG. 2.

Figure 2:
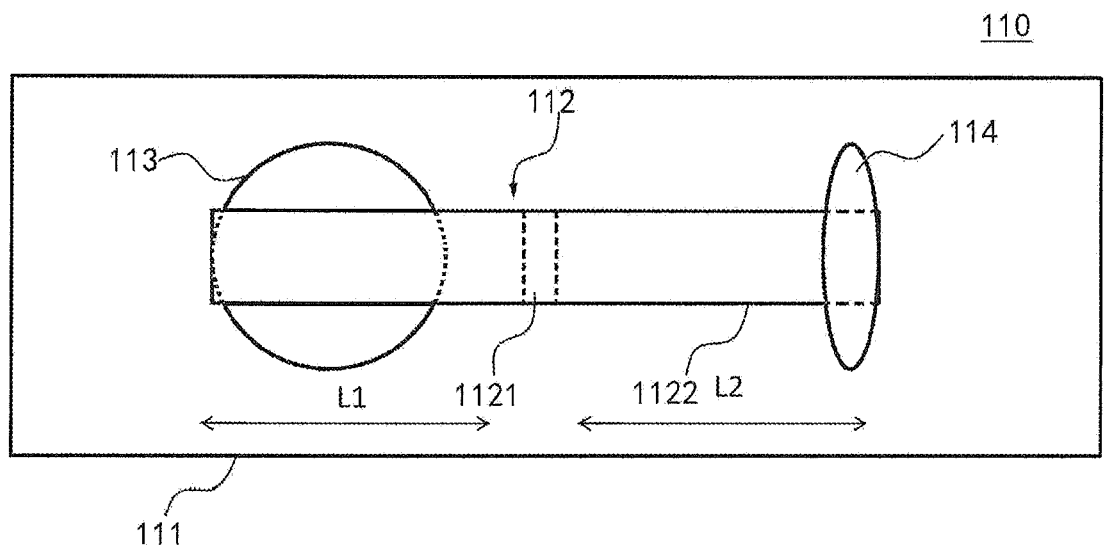
FIG. 2 is a top view of the vibration optical path assembly shown in FIG. 1.

As shown in FIG. 1 and FIG. 2, in the present embodiment, the optical platform 111 may be reconfigured by using an existing structure. In order to facilitate understanding and description, in the present embodiment and the part of embodiments as follows (embodiments not specifically described), the optical platform 111 is based on a horizontal arrangement, and the arrangement of other structures is correspondingly explained. However, it will be readily understood by those skilled in the art that when the optical platform 111 is mounted at a spectroscopic analysis device such as a spectrograph, the arrangement of the optical platform 111 is not limited to horizontal arrangement. Further, for example, in some hand-held spectrographs, the optical platform 111 is not limited to the horizontal arrangement that is parallel to the horizontal direction. The above description of the horizontal arrangement is only a relative, exemplary illustration, and does not impose any limitation on the arrangement of the optical platform in other embodiments of the present disclosure.

As shown in FIG. 1 and FIG. 2, the cantilever 112 is provided at the optical platform 111. The cantilever 112 includes at least a vertical arm 1121 provided at the optical platform 111 and a cross arm 1122 provided at the vertical arm 1121. Specifically, in the present embodiment, the vertical arm 1121 is relatively perpendicular to the optical platform 111. The cross arm 1122 is relatively parallel to the optical platform 111. The top part of the vertical arm 1121 is connected to a central position in an extending direction of the cross arm 1122 (that is, a position other than two ends, a center position is shown in the drawing). That is, in the present embodiment, the cantilever 112 is provided with a substantially T-shaped structure. In addition, an incident direction of the light is defined, that is, an incident laser direction F0 (further be designed as the incident direction of the light) is parallel to the optical platform 111 and parallel to the extending direction of the cross arm 1122. The vibration generating device 113 and the optical lens 114 are respectively provided at positions adjacent to two end parts of the cross arm 1122. That is, the above two are respectively provided at the two end parts of the cross arm 1122 along the incident laser direction F0. In the embodiment, both the cross arm 1122 and the vertical arm 1121 can be made of an elastic material. The vibration generating device 113 is capable of adjustably generating a first vibration. The first vibration can be transmitted to the optical lens 114 via the cantilever 112, and the optical lens 114 is caused to generate a corresponding second vibration, so that when the incident laser light passes through the optical lens 114 to form the light spot on the substance to be tested, the light spot movement phenomenon is occurred due to the vibration of the optical lens 114, and the light spot movement phenomenon is specifically expressed by the fact that the light spot reciprocates rapidly and at high frequency.

In addition, in the present embodiment, the cantilever 112 can be made of a reed, that is, the vertical arm 1121 and the cross arm 1122 are designed as reeds, thereby maximally ensuring the transmission of vibration and minimizing the attenuation of amplitude during the process of the first vibration transmission to the second vibration. In other embodiments, the material of the cantilever 112 can further be flexibly adjusted based on a general structure of the cantilever 112 in the present embodiment. For example, the vertical arm 1121 may be made of a rigid material, and the cross arm 1122 must be made of an elastic material. Alternatively, the cross arm 1122 may be made of the rigid material, and the vertical arm 1121 must be made of the elastic material. That is, at least one of the vertical arm 1121 and the cross arm 1122 is made of the elastic material to ensure the transmission of vibration. For example, the elastic material is not limited to the above-mentioned reed, and various existing elastic materials may be selected, which are not limited thereto.

Further, in the present embodiment, the vibration generating device 113 may be a vibration generator with a button type which is small in size and can be adapted to the demands of miniaturization of the optical analysis device. At the same time, by setting different vibration frequencies of the vibration generator with the button type, the amplitude and frequency of the first vibration generated by the vibration generator with the button type can be adjusted. In other embodiments, the vibration generator with the button type can further be replaced by other types of vibration generating devices, and a setting position of the vibration source is not limited to the cantilever 112, and a vibration principle is not limited to the principle of mechanical vibration. For example, vibration source of the vibration generating device 113 can be disposed at the optical platform 111. The first vibration generated by the vibration source is transmitted to the cantilever 112 through a vibration transmitting element (for example, a striker or the like), and is transmitted to the optical lens 114 through the cantilever 112 to generate the second vibration. For example, the first vibration may be generated by the vibration transmission element based on other vibration initiation principles such as electromagnetic oscillation and acoustic vibration. Or by driving the cantilever 112 (reed), other vibration modes are generated such as simple harmonic vibration or forced vibration, which is not limited thereto.

Further, in the present embodiment, a number of the optical lenses 114 are at least one. Further, when there are a plurality of optical lenses 114, the plurality of optical lenses 114 are disposed at one end of the cross arm 1122. And the plurality of optical lenses 114 are optical axis coincidence and interval arranged along the extending direction of the cross arm 1122 (that is, the laser incident direction).

Further, in order to prevent the vibration generating device 113 from interfering with the incident path of the incident laser light and then blocking the incident laser light incident on the optical lens 114, in the present embodiment, as shown in FIG. 1, the vibration generating device 113 and the optical lens 114 can be disposed at opposite surfaces of the cross arm 1122. Further, in consideration of the possibility of blockage of the structure of the vertical arm 1121, in the present embodiment, the optical lens 114 is disposed at the upper surface of the cross arm 1122, and the vibration generating device 113 is disposed at the lower surface of the cross arm 1122. Accordingly, there is no structure other than the optical lens 114 in the incident laser direction F0, which ensures that the incident laser light is not blocked.

Further, in order to more accurately control the transmission of the vibration, the adjustment of a amplitude ratio of the first vibration to the second vibration can be achieved by adjusting the relative positions of the vertical arm 1121 and the cross arm 1122. That is, in the present embodiment, the position at which the vertical arm 1121 is connected to the cross arm 1122 is defined as a reference point. The adjustment of a amplitude transfer ratio of the first vibration to the second vibration can be achieved by adjusting the distance L1 between the vibration generating device 113 and the reference point and the distance L2 between the optical lens 114 and the reference point, that is, adjusting the position at which the vertical arm 1121 is connected to the cross arm 1122. It should be further noted that the vibration generating device 113 and the optical lens 114 shown in FIG. 1 and FIG. 2 are merely illustrative. The size of the vibration generating device 113 and the center position of the vibration source and the thickness of the optical lens 114 do not represent the actual size or position of the above structure. In adjusting the amplitude transfer ratio of the first vibration and the second vibration, it is also necessary to consider the influence of the above factors.

Furthermore, as shown in FIG. 1 and FIG. 2, in the present embodiment, since the vertical arm 1121 and the cross arm 1122 are both designed as a sheet shape structure of the reed and provided with width, in order to reduce its the influence on the vibration transmission, the direction along the width of the vertical arm 1121 is perpendicular to the incident laser direction F0 and parallel to the optical platform 111, but it is not limited thereto.

As described above, based on the above design of the present embodiment, the first vibration direction F1 is perpendicular to the optical platform 111 and perpendicular to the incident laser direction F0. The second vibration direction F2 is further perpendicular to the optical platform 111 and perpendicular to the incident laser direction F0. Accordingly, the incident laser light is concentrated via the optical lens 114 to form a moving light spot on the surface of the substance to be tested, and the scanning pattern of the light spot can be substantially referred to the scanning pattern P1 in FIG. 16.

The Second Embodiment of the Vibration Optical Path Assembly

Figure 3:
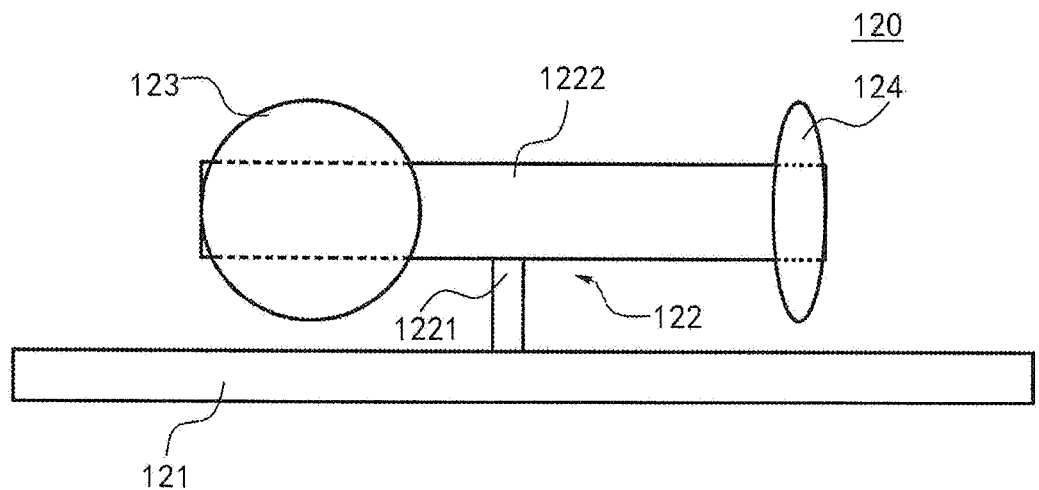
FIG. 3 is a side view of a vibration optical path assembly according to another exemplary embodiment.
Figure 4:
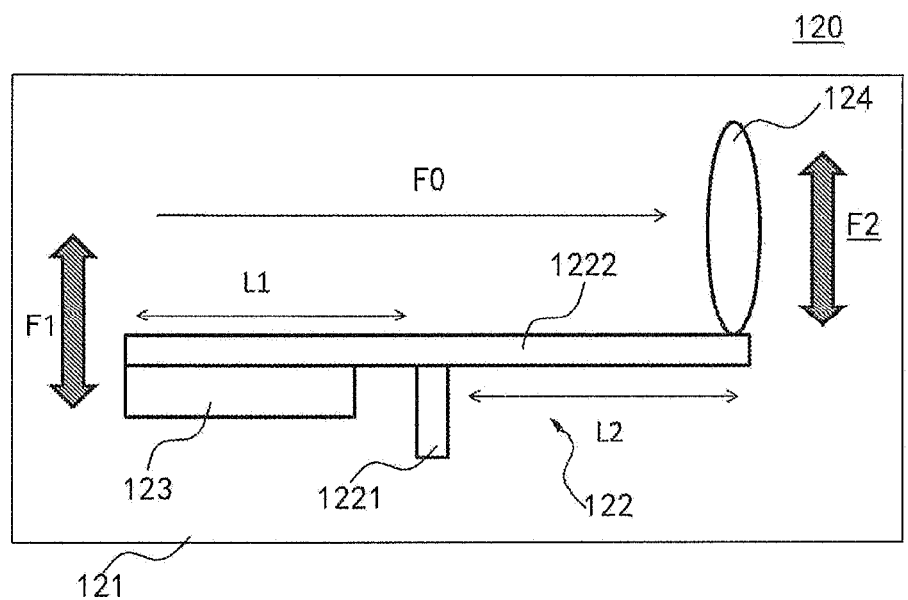
FIG. 4 is a top view of the vibration optical path assembly shown in FIG. 3.

Referring to FIG. 3 and FIG. 4, FIG. 3 representatively shows a side view of a vibration optical path assembly 120 capable of embodying the principles of the present disclosure according to another exemplary embodiment. FIG. 4 representatively shows a top view of the vibration optical path assembly 120 shown in FIG. 3. In the exemplary embodiment, the vibration optical path assembly 120 provided by the present disclosure mainly includes an optical platform 121, a cantilever 122, a vibration generating device 123 and an optical lens 124. And the cantilever 122 mainly includes a vertical arm 1221 and a cross arm 1222. In the embodiment, the structure and function of the vibration optical path assembly 120 in the present embodiment are substantially the same as those of the above described vibration optical path assembly, but the difference is as followings.

As shown in FIG. 3 and FIG. 4, in the present embodiment, the cross arm 1222 is inverted by 90° with respect to the cross arm 1122 in the first embodiment with its own extending direction as an axis. That is, the upper surface and lower surface of the cross arm 1222 are inverted to be two side surfaces of the cross arm 1222, and one side of the top part of the vertical arm 1221 is connected to a middle position of a side surface of the cross arm 1222. In the embodiment, the first vibration direction F1 is perpendicular to the optical platform 121 and perpendicular to the incident laser direction F0. The second vibration direction F2 is further perpendicular to the optical platform 121 and perpendicular to the incident laser direction F0. Accordingly, the incident laser light is concentrated via the optical lens 124 to form a moving light spot on the surface of the substance to be tested, and the scanning pattern of the light spot can be substantially referred to the scanning pattern P1 in FIG. 16.

Further, in order to prevent the vibration generating device 123 from interfering with the incident path of the incident laser light and then blocking the incident laser light incident on the optical lens 124, In the present embodiment, as shown in FIG. 4, the vibration generating device 123 and the optical lens 124 can be disposed at two side surfaces opposite with each other of the cross arm 1222. Further, in consideration of the possibility of blockage of the structure of the vertical arm 1221, in the present embodiment, the optical lens 124 is disposed at the side surface of the two side surfaces of the cross arm 1122 where the vertical arm 1221 is not connected, and the vibration generating device 123 is disposed at the side surface of the two side surfaces of the cross arm 1122 to where the vertical arm 1221 is connected. Accordingly, there is no structure other than the optical lens 124 in the incident laser direction F0, which ensures that the incident laser light is not blocked.

The Third Embodiment of the Vibration Optical Path Assembly

Referring to FIG. 5 and FIG. 6, FIG. 5 representatively shows a longitudinal view of a vibration optical path assembly 130 capable of embodying the principles of the present disclosure according to another exemplary embodiment. FIG. 6 representatively shows a top view of the vibration optical path assembly 130 shown in FIG. 5. In the exemplary embodiment, the vibration optical path assembly 130 provided by the present disclosure mainly includes an optical platform 131, a cantilever 132, a vibration generating device 133 and an optical lens 134. And the cantilever 132 mainly includes a vertical arm 1321 and a cross arm 1322. In the embodiment, the structure and function of the vibration optical path assembly 130 in the present embodiment are substantially the same as those of the above described vibration optical path assembly, but the difference is as follows.

As shown in FIG. 5 and FIG. 6, in the present embodiment, the vertical arm 1321 is perpendicular to the optical platform 131. The cross arm 1322 is provided at a side of the vertical arm 1321 and is connected to a middle position in a height direction H of the vertical arm 1321. The incident laser direction F0 is defined to be parallel to the optical platform 131. The extending direction of the cross arm 1322 is parallel to the optical platform 131 and perpendicular to the incident laser direction F0. In the embodiment, the vibration generator is disposed at the cross arm 1322. The optical lens 134 is disposed at the top part of the vertical arm 1321, and the cross arm 1322 and the vertical arm 1321 are both made of elastic materials. Based on the above design of the present embodiment, the first vibration direction F1 is perpendicular to the optical platform 131 and perpendicular to the light incident direction, and the second vibration direction F2 is parallel to the optical platform 131 and perpendicular to the light incident direction. Accordingly, the incident laser light is concentrated via the optical lens 134 to form the moving light spot on the surface of the substance to be tested, and the scanning pattern of the light spot can be substantially referred to the scanning pattern P2 in FIG. 16.

Further, in order to prevent the vibration generating device 133 from interfering with the incident path of the incident laser light blocking the incident laser light incident on the optical lens 134. In the present embodiment, as shown in FIG. 5, The vibration generating device 133 can be disposed below the cross arm 1322, that is, the bottom position of the cross arm 1322 away from the top part of the vertical arm 1321 (optical lens 134). Accordingly, there is no structure other than the optical lens 134 in the incident laser direction F0, which ensures that the incident laser light is not blocked.

The Fourth Embodiment of the Vibration Optical Path Assembly

Referring to FIG. 7 and FIG. 8, FIG. 7 representatively shows a longitudinal view of a vibration optical path assembly 140 capable of embodying the principles of the present disclosure according to another exemplary embodiment. FIG. 8 representatively shows another longitudinal view of another design in the embodiment. In the exemplary embodiment, the vibration optical path assembly 140 provided by the present disclosure mainly includes an optical platform 141, a cantilever 142, a vibration generating device 143 and an optical lens 144. And the cantilever 142 mainly includes a vertical arm 1421 and a cross arm 1422. In the embodiment, the structure and function of the vibration optical path assembly 140 in the present embodiment are substantially the same as those of the third embodiment of the vibration optical path assembly, but the difference is as follows.

As shown in FIG. 7 and FIG. 8, in the present embodiment, the optical lens 144 is disposed at a side position adjacent to the top part of the vertical arm 1421. As shown in FIG. 7, in the present embodiment, the optical lens 144 is disposed at a position near the top part of the vertical arm 1421, and is located at the side opposite to the side of the vertical arm 1421 to which the cross arm 1422 is connected. Alternatively, as shown in FIG. 8, the optical lens 144 may further be located at the same side of the vertical arm 1421 to which the cross arm 1422 is connected. Based on the above design, the present embodiment can adjust the amplitude and height of the vibration to a greater extent than the third embodiment of the vibrating optical path assembly, thereby making the entire structure more compact.

Figure 9:
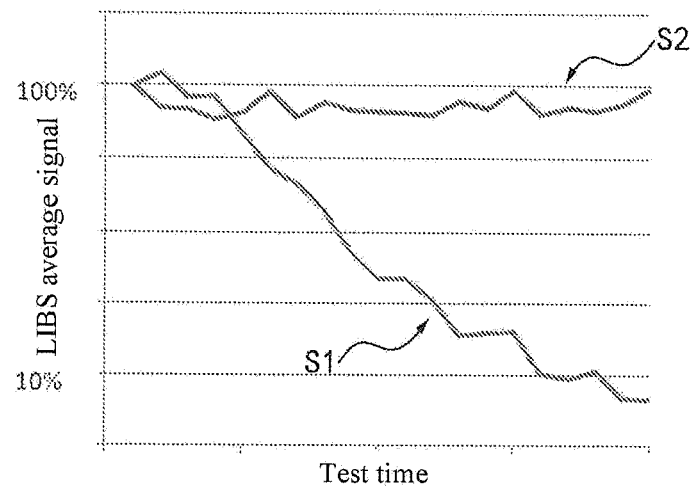
FIG. 9 is a comparative schematic diagram of a LIBS average signal in present or absence of design of a vibration optical path assembly.

In the embodiment, based on the above detailed description of a first embodiment, a second embodiment, a third embodiment and a fourth embodiment of the vibration optical path assembly proposed by the present disclosure, the main difference between the present disclosure and the related art is that in the laser light transmission path of the existing laser induced breakdown spectrograph, if a condenser lens is fixed, the focus position is unchanged. As a surface substance of the substance to be tested is excited by the laser and is consumed and formed into an impact crater, the LIBS signal will be rapidly attenuated. Referring to FIG. 9, a comparison of the LIBS average signal with or without the vibrating optical path assembly is representatively shown in FIG. 9. Specifically, referring to a signal curve SI in FIG. 9, in the case where the existing device does not have the vibrating optical path component can be seen, and the average signal of the LIBS is attenuated by about 90% for a test period. Referring to a signal curve S2 in FIG. 9, it can be seen that after the vibrating optical path assembly proposed by the present disclosure, the LIBS signal hardly attenuates during the same test time. The reason is that the movement of the light spot is generated by the vibrating optical path assembly, and the substance to be tested of a certain contact point is not consumed too quickly to form an impact crater, thereby ensuring that the light spot is sufficiently in contact with the surface of a new position of the substance to be tested to ensure the contact and the stability of the LIBS signal.

In several embodiments described above, an optical axis direction of the optical lens is always parallel to an incident laser direction F0, thereby ensuring that the movement of an exit laser is provided with only a component perpendicular to an optical axis of the system, and not provided with the component parallel to the optical axis of the system. If the vibration optical path assembly is rotated at a certain angle to the optical axis of the system, a vibration component parallel to the optical axis of the system can be generated. The vibration component can be used to compensate for the problem that the focus and the surface of the substance to be tested cannot completely coincide when the light spot moves on the surface due to the unevenness of the surface of the substance to be tested. Hereinafter, specific embodiments for solving the above problems will be described in detail.

The Fifth Embodiment of the Vibration Optical Path Assembly

Figure 10:
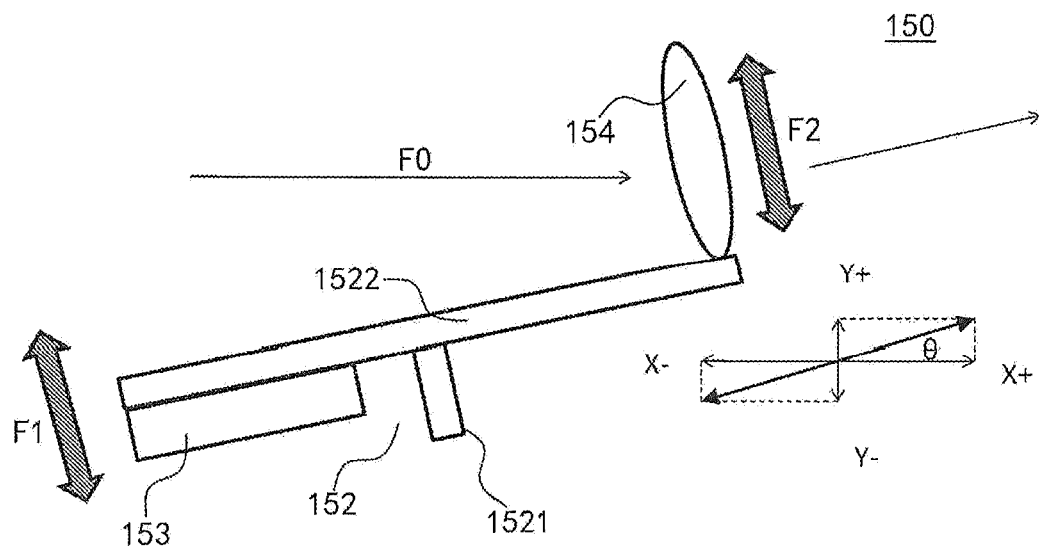
FIG. 10 is a side view of a vibration optical path assembly according to still another exemplary embodiment.

Referring to FIG. 10, FIG. 10 representatively shows a side view of a vibration optical path assembly 150 capable of embodying the principles of the present disclosure according to still another exemplary embodiment. In the exemplary embodiment, the vibration optical path assembly 150 provided by the present disclosure mainly includes an optical platform, a cantilever 152, a vibration generating device 153 and an optical lens 154. And the cantilever 152 mainly includes a vertical arm 1521 and a cross arm 1522. In the embodiment, the structure and function of the vibration optical path assembly 150 in the present embodiment are substantially the same as those of the above described vibration optical path assembly, but the difference is as followings.

As shown in FIG. 10, in the present embodiment, based on the design that the top part of the vertical arm 1521 is connected to the middle position of the cross arm 1522 along the extending direction of the cross arm 1522, and the vibration generating device 153 and the optical lens 154 are respectively disposed at the position adjacent to the two end parts of the cross arm 1522, a tilting angle is provided between the cross arm 1522 and the optical platform, and the cross arm 1522 is made of the elastic material. Specifically, in the present embodiment, a tilting angle is provided between the vertical arm 1521 and the optical platform, and a relative positional relationship between the cross arm 1522 and the vertical arm 1521 is maintained in a vertical state, and the tilting angle between the cross arm 1522 and the optical platform is an difference between 90° and the tilting angle between the vertical arm 1521 and the optical platform. In other embodiments, the design of the tilting angle between the cross arm 1522 and the optical platform may further be implemented in other ways. For example, the vertical arm 1521 can be kept perpendicular to the optical platform, which causes that the relative position of the cross arm 1522 and the vertical arm 1521 is provided with the tilting angle, and the difference between the titling angle and the 90° is a titling angle between the cross arm 1522 and the optical platform.

It should be noted that the above description of the present embodiment is merely exemplary, and only the configuration in which the vibration generating device 153 and the optical lens 154 are provided on the cross arm 1522 is described. The essence of the above design can be understood as that when the incident laser direction F0 is parallel to the optical platform, by designing the cross arm 1522 provided with the titling angle with the optical platform, that is, the cross arm 1522 provided with the titling angle with the incident laser direction F0, the angle between the incident surface of the optical lens 154 and the incident laser direction F0 is changed (the incident surface is substantially regarded as a plane, and taking the incident surface is perpendicular to the cross arm 1522 on which the optical lens 154 is disposed as an example, when the cross arm 1522 is parallel to the optical platform, the incident laser direction F0 is substantially perpendicular to the incident surface of the optical lens 154), so that the incident angle between the incident laser direction F0 and the optical lens 154 is adjusted, and the light spot concentrated on the substance to be tested is provided with the component perpendicular to the optical axis of the system. The component can move the light spot and is suitable for use when the surface of the substance to be tested is curved or is provided with a certain degree of unevenness.

Further, based on the above principle, for the other structure of the vibration optical path assembly, for example, the vibration optical path assembly of the third embodiment, the optical lens 134 is not provided at the cross arm 1322 together with the vibration generating device 133, but is provided at the vertical arm 1321. In order to achieve the above effects, the vertical arm 1321 can be disposed to have a tilting angle with the optical platform to change the incident angle of the incident laser direction F0 and the optical lens 134. Alternatively, in other embodiments, taking the optical lens is disposed at the cross arm as an example, the optical lens may be disposed obliquely so as to provide a titling angle to the cross arm. Then, incident angles between the incident laser direction F0 and the optical lens are changed, and at this time, the cross arm can be kept parallel to the optical platform, that is, parallel to the incident laser direction F0.

Figures 11, 12, 13:
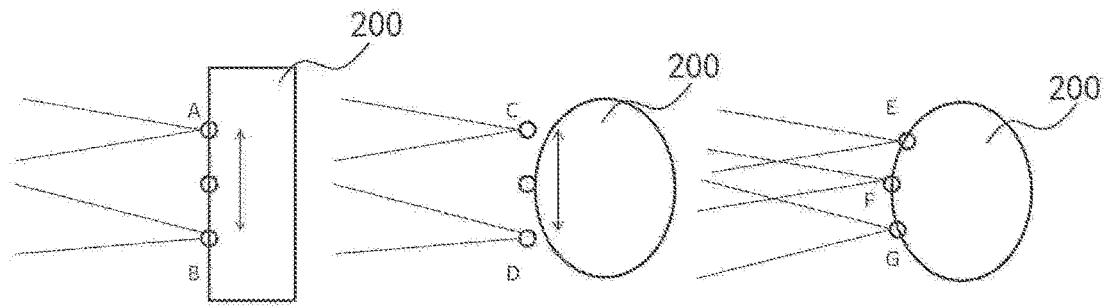
FIG. 11 is a schematic diagram of a case in which a laser convergence point and a surface of a substance to be tested are combined based on design of a vibration optical path assembly.
FIG. 12 is a schematic diagram of another case in which a laser convergence point and a surface of a substance to be tested combined based on design of a vibration optical path assembly.
FIG. 13 is a schematic diagram of still another case in which a laser convergence point and a surface of a substance to be tested combined based on design of a vibration optical path assembly.
Figure 14:
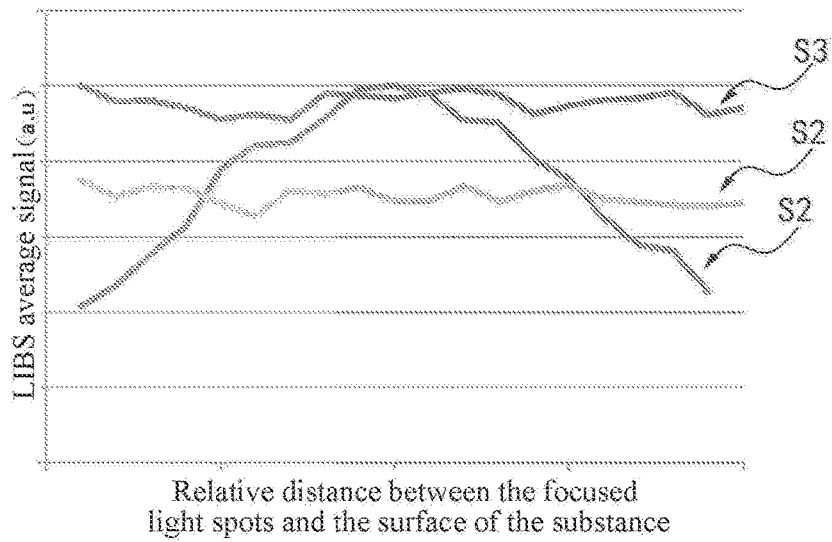
FIG. 14 is a comparative schematic diagram of LIBS average signal in design of FIG. 11, FIG. 12 and FIG. 13.

In accordance with the above, and with reference to FIG. 11 to FIG. 14, FIG. 11 representatively shows a schematic diagram of a case in which a laser convergence point and a surface of a substance 200 to be tested are combined. FIG. 12 representatively shows a schematic diagram of another case in which a laser convergence point and a surface of a substance 200 to be tested are combined. FIG. 13 representatively shows a schematic diagram of still another case in which a laser convergence point and a surface of a substance 200 to be tested are combined.

In the embodiment, the case shown in FIG. 11 is a preferred ideal. That is, the surface of the substance 200 to be tested is relatively flat, and based on the design of the first embodiment to a fourth embodiment of the above-described vibration optical path assembly, the focused light spot reciprocates substantially between the convergence point A and the convergence point B. At this time, even if there is only one focused light spot moving in the direction parallel to the surface of the substance 200 to be tested, the focused light spots doesn't deviate from the surface of the substance 200 to be tested at any position between the convergence point A and the convergence point B. Therefore, the vibration optical path assembly 150 designed by the above embodiment is more suitable for the convergence of the light spot when the surface of the substance 200 to be tested is relatively flat.

However, the case shown in FIG. 12 is that in some special cases, the surface of the substance 200 to be tested is an uneven surface. If still based on the design of the first embodiment to the fourth embodiment of the above-described vibration optical path assembly, if there is only one focused light spot moving in the direction parallel to the surface of the substance 200 to be tested, there will be a convergence focus between the convergence point C and the convergence point D which is just fallen on the surface of the substance 200 to be tested. But, at other positions between the convergence point C and the convergence point D, the convergence point cannot be fallen on the surface of the substance 200 to be tested. Therefore, the vibration optical path assembly designed by the above embodiment may have a certain influence on a light spot convergence effect in the case of the surface of the substance 200 to be tested is not flat.

The state shown in FIG. 13 is a state in which the surface of the substance 200 to be tested is substantially similar to that in FIG. 12, but it is based on the design of the fifth embodiment of the above-described vibration optical path assembly. That is, in a direction perpendicular to the surface of the substance 200 to be tested (in this case, an uneven surface is approximated as a plane for easy understanding, or can be understood as a direction parallel to the optical axis of the system), when the focused light spot is further provided with a moving component, such as a curve region defined by the convergence point E, the convergence point F, and the convergence point G, it is ensured that each of convergence points of the light spot is fallen accurately on the surface of the substance 200 to be tested.

As described above, in conjunction with FIG. 14, signal curves of LIBS average signals in three cases shown in FIG. 11, FIG. 12, and FIG. 13, respectively. In the embodiment, the signal curve S3 corresponds to FIG. 11, the signal curve S4 corresponds to FIG. 12, and the signal curve S5 corresponds to FIG. 13. As is apparent from three signal curves in FIG. 14, it is understood that the design of the vibration optical path assembly 150 according to the fifth embodiment described above is less affected by the unevenness of the surface of the substance 200 to be tested. In particular, when the surface of the substance 200 to be tested is non-planar, the design of the vibration optical path assembly 150 proposed by the embodiment can further ensure the stability of the LIBS average signal.

The Sixth Embodiment of Vibration Optical Path Assembly

Figure 15:
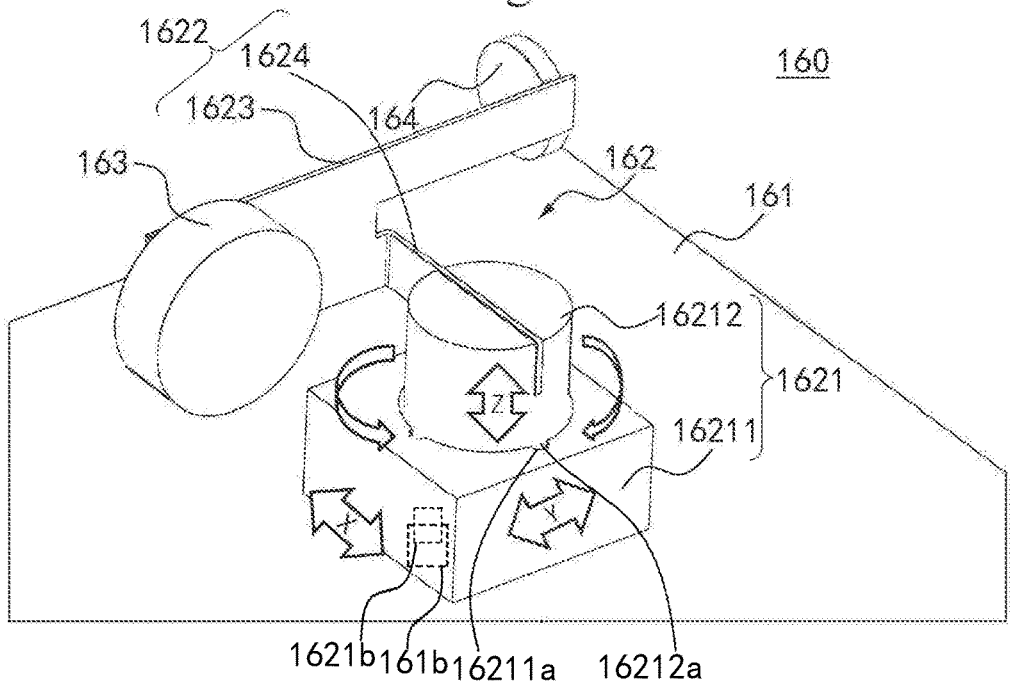
FIG. 15 is a perspective structural schematic view of a vibration optical path assembly according to still another exemplary embodiment.

Refer to FIG. 15, the FIG. 15 representatively shows a perspective structural schematic view of a vibration optical path assembly 160 capable of embodying the principles of the present disclosure according to still another exemplary embodiment. In the present embodiment, the structure of the vibration optical path assembly 160 is substantially the same as that of the above embodiment. For example, the cantilever 162 is provided with a vertical arm 1621 and a cross arm 1623. The vertical arm 1621 is disposed at the optical platform 161. The cross arm 1622 is connected to the vertical arm 1621, and a vibration generating device 163 and optical lens 164 are respectively disposed at the two ends of the cross arm 1622. However, based on the above structure, the vibration optical path assembly 160 of the present embodiment has the following differences compared with the above embodiments.

As shown in FIG. 15, in the present embodiment, the vertical arm 1621 is designed as a sleeve type structure including a first sleeve 16211 and a second sleeve 16212 which are sleeved with each other, and the cross arm 1622 is provided with a body part 1623 and a connection part 1624. Specifically, the second sleeve 16212 of the vertical arm is partially sleeved in the first sleeve 16211. The connection part 1624 of the cross arm 1622 is connected to a central position of the body part 1623 in the extending direction of the body part 1623 and is extended to the second sleeve 16212. The body part 1623 of the cross arm 1622 is connected to the second sleeve 16212 via a connection part 1624. In the embodiment, the second sleeve 16212 is configured to adjustably move up and down relative to the first sleeve 16211 in a direction perpendicular to the optical platform 161 such that the cross arm 1622 and the vibration generating device 163 and the optical lens 164 disposed thereon can have a lift adjustment function in the direction perpendicular to the optical platform 161. At the same time, the first sleeve 16211 and the second sleeve 16212 can be designed to be relatively rotatable, so that the cross arm and the elements disposed thereon have a rotational adjustment function in a direction parallel to the optical platform 161. In addition, the implementation of the above functions is not limited to the technical solutions described in the embodiments. For example, in other embodiments, the vertical arm 1621 mainly includes a first arm 16211 and a second arm 16212 which are perpendicular to the optical platform 161 (or provided with the tilting angle) (the first sleeve 16211 and the second sleeve 16212 of the present embodiment are respectively equivalent to the first arm 16211 and the second arm 16212). In the embodiment, the first arm 16211 is disposed at the optical platform 161. The second arm 16212 is configured to adjustably move up and down relative to the first sleeve 16211 in the direction perpendicular to the optical platform 161. The second arm is connected to the middle position of the cross arm 1622 in the extending direction of the cross arm 1622. In addition, the first arm 16211 and the second arm 16212 can further be designed as a relatively rotatable structure.

Further, as shown in FIG. 15, in the present embodiment, the vertical arm 1621 may be designed as the reed. In addition, the body part 1623 and the connection part 1624 of the vertical arm 1621 are designed as an integrated structure, and the connection part 1624 is formed by partially bent of the body part 1623, but the present disclosure is not limited thereto.

Further, in order to position the first sleeve 16211 and the second sleeve 16212 at different heights of the vertical arm 1621, in the present embodiment, the inner wall of the first sleeve 16211 are provided with a plurality of sets of first positioning structures 16211a spaced along the height direction thereof. And the outer wall of the second sleeve 16212 is provided with a second positioning structure 16212a that is cooperated with the first positioning structure 16211a to position the second sleeve 16212 and the first sleeve 16211 with each other when the second sleeve 16212 is adjusted to a different position relative to the first sleeve 16211. In other embodiments, when using the first arm 16211 and the second arm 16212 which are different from structures of the first sleeve 16211 and the second sleeve 16212, the first arm 16211 and the second arm 16212 may further be respectively provided with the first positioning structure 16211a and the second positioning structure 16212a to position the first arm 16211 and the second arm 16212 when the second arm 16212 is risen and fallen to a different position relative to the first arm 16211.

In addition, in the embodiment, the vertical arm is provided with at least one set of third positioning structures 1621b, and the optical platform 161 is provided with a plurality of sets of fourth positioning structures 161b, so that when the cantilever 162 is adjusted to different positions of the optical platform 161, the vertical arm and the optical platforms 161 are positioned relative to one another. Based on the above structure, the overall movement of the structures of the vertical arm, the cross arm, the vibration generating device 163, and the optical lens 164 at the optical platform 161 can be realized, which provides a wider degree of freedom when the above structure is disposed at the optical platform 161. In addition, the arrangement and cooperation relationship of the third positioning structure 1621b and the fourth positioning structure 161b are not limited to the embodiment, which can further be applied to the above embodiments or other embodiments not mentioned in the specification, and the present disclosure is not limited thereto.

As described above, each of the positioning structures in the present embodiment can be designed as a jig or a latch. In addition, glue or other means of adhesion between the lower part of the second sleeve 16212 and the first sleeve 16211 may be adopted if the design requirements are determined during the manufacturing process and no adjustment is needed during use of the product. Similarly, the first sleeve 16211 and the optical platform 161 may be adhered by other means, which are not limited thereto. In addition, in order to adapt to the miniaturization design trend of the LIBS spectrograph, for example, the vibration optical path assembly 160 has a simple structure and a small volume, and can be designed as an example of 12 mm×12 mm×12 mm, and the corresponding weight is less than 5 g.

Figure 16:
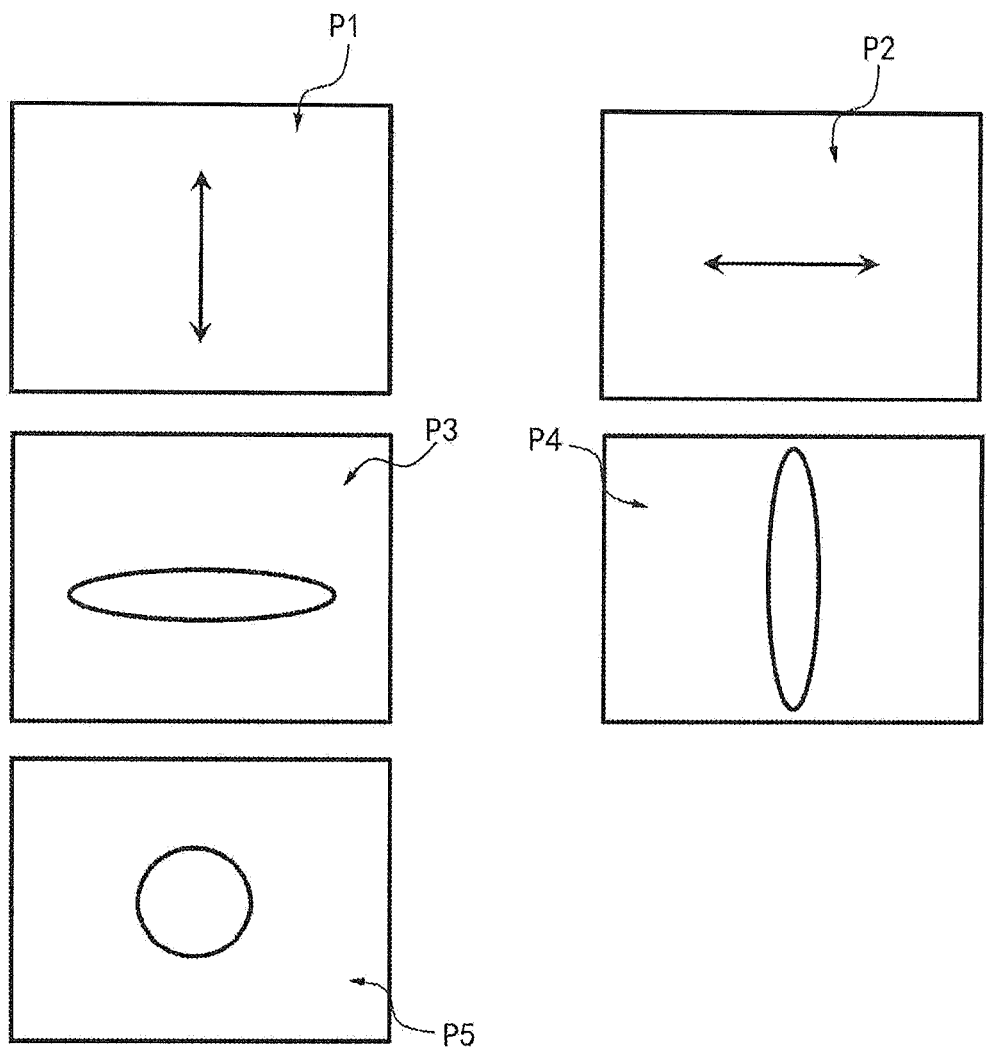
FIG. 16 is schematic diagram of five scanning patterns formed corresponding to different embodiments of a vibration optical path assembly.

In view of the above description of various embodiments of the vibration optical path assembly proposed by the present disclosure, FIG. 16 shows five scanning patterns correspondingly formed based on different embodiments of the vibration optical path assemblies described above. In one embodiment the scanning pattern P1 may be substantially corresponded to the focused light spots of the first embodiment, the second embodiment and the fifth embodiment and the scanning pattern P2 may be substantially corresponded to the focused light spots of the third embodiment and the fourth embodiment. The scanning pattern P3, the scanning pattern P4 and the scanning pattern P5 may be corresponded to the focused light spots of the sixth embodiment in different cases, respectively.

It should be noted herein that the vibration optical path assembly shown in the drawings and described in this specification is just a few examples of many types of vibration optical path assemblies that can employ the principles of the present disclosure. It should be clearly understood that the principles of the present disclosure are not limited to any detail of the vibration optical path assembly shown in the drawings or described in this specification or any component of the vibrating optical path assembly.

In summary of the above embodiments, in the vibration optical path assembly provided by the present disclosure, the cantilever provided with vibration generating device and optical lens is disposed at the optical platform, and the vibration generated by the vibrating generating device is transmitted to the optical lens by the cantilever having elastic materials, which makes that the light is transmitted through the optical lens to form the light spot on the surface of the substance to be tested to generate a light spot movement phenomenon. Since the light spot movement phenomenon is generated based on rapid reciprocating vibration of the optical lens, which can increase the sampling area and maintain stable plasma generation, and at the same time ensure that the focus of the light is always fallen on the surface of the substance to be tested, thereby maintaining the generation of the stable plasma and making that quantitative analysis with excellent repeatability and accuracy is possible. In addition, since the design of transmitting vibration by adopting the elastic material for at least part of the material of the cantilever, it is not necessary to provide a driving mechanism for driving the optical platform to move, and the vibration optical path assembly of the present disclosure has a small volume.

The First Embodiment of a Laser Induced Breakdown Spectrograph

Figure 17:
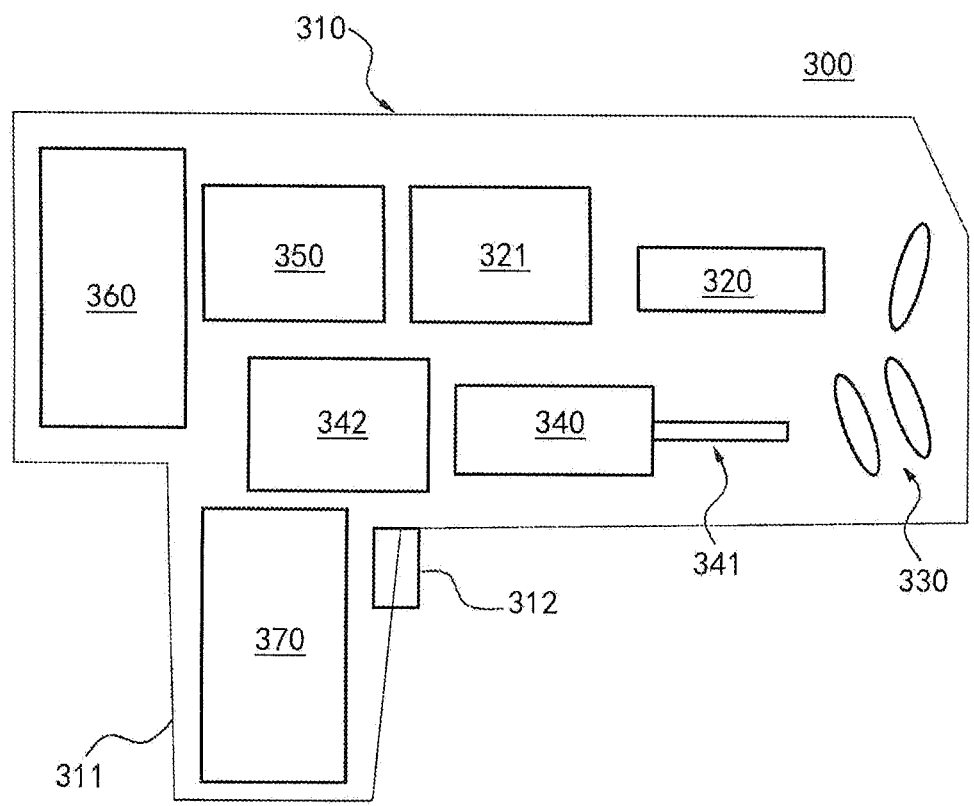
FIG. 17 is a block schematic diagram of a laser induced breakdown spectrograph according to an exemplary embodiment.

Reference to FIG. 17, the FIG. 17 representatively shows a block schematic view of a laser induced breakdown spectrograph 300 capable of embodying the principles of the present disclosure. In the exemplary embodiment, the laser induced breakdown spectrograph 300 provided by the present disclosure is described by taking a hand-held LIBS spectrograph adapted to the trend of miniaturization design as an example. Those skilled in the art will readily appreciate that various modifications, additions, replacement, deletion or other change are made to the specific embodiments described below in order to apply the design of the handheld LIBS spectrograph to other types of laser induced breakdown spectrographs or other spectrograph devices, these variations are still within the scope of the principles of the laser induced breakdown spectrograph 300 provided by the present disclosure.

As shown in FIG. 17, in the present embodiment, the LIBS spectrograph proposed by the present disclosure can be used for spectral analysis of the substance to be tested. The LIBS spectrograph mainly includes a laser, an optical path component, a spectrograph, and a signal acquisition component. In particular, the laser is configured to emit a high energy pulsed laser. The optical path component is disposed between the laser and the substance to be tested to focus the high energy pulsed laser to the substance to be tested to form the light spot. The spectrograph is configured to receive photons generated by the high energy pulsed laser bombardment of the substance to be tested and perform spectral analysis. The signal acquisition component is disposed between the substance to be tested and the spectrograph to collect photons to the spectrograph. Wherein the optical path component of the LIBS spectrograph adopts the vibration optical path assembly provided by any one of embodiments above described of the present disclosure. That is, by the transmission and focusing of the high-energy pulsed laser (hereinafter referred to as laser) by the vibration optical path assembly, the light spot formed by the laser focusing on the surface of the object to be measured generates the light spot movement phenomenon.

Further, as shown in FIG. 17, in the present embodiment, the spectrograph for performing spectral analysis of the above LIBS spectrograph may be an optical fiber spectrograph. The fiber optic spectrograph has a fiber bundle for receiving photons for spectral analysis by a fiber optic spectrograph. Additionally, the signal acquisition component can include at least one lens (a lens group of two lenses is shown). In the present embodiment, the path of the photon on the surface of the substance to be tested→the lens→the bundle of fibers is the signal acquisition path.

In addition, other related elements or structures are not mentioned in the above detailed description of the embodiments for the convenience of reading and understanding. As shown in FIG. 17, when the laser induced breakdown spectrograph 300 provided by the present disclosure is configured as the hand-held LIBS spectrograph, the laser induced breakdown spectrograph 300 may further include a housing 310 having a handle 311 and a trigger button 312, a laser 320 with a laser driving circuit 321, a spectrograph driving circuit 342 disposed at the fiber spectrograph, a system main board 350, a display screen 360 having a touch function, a battery pack 370 and lens 330, etc. Appropriate existing structures or components may be employed in the above structures or components, and which are not described herein.

As described above, the laser induced breakdown spectrograph 300 of the present disclosure forms the vibration optical path between the laser and the substance to be tested by using the vibration optical path assembly provided by the present disclosure, so that the laser induced breakdown spectrograph 300 has a light spot movement function. In addition, due to the small volume of the vibration optical path assembly, the present disclosure can meet the design requirements for miniaturization of the spectroscopic device, for example, a spectrograph suitable for being configured as the hand-held LIBS spectrograph or other miniaturized design.

The Second Embodiment of the Laser Induced Breakdown Spectrograph

Figure 18:
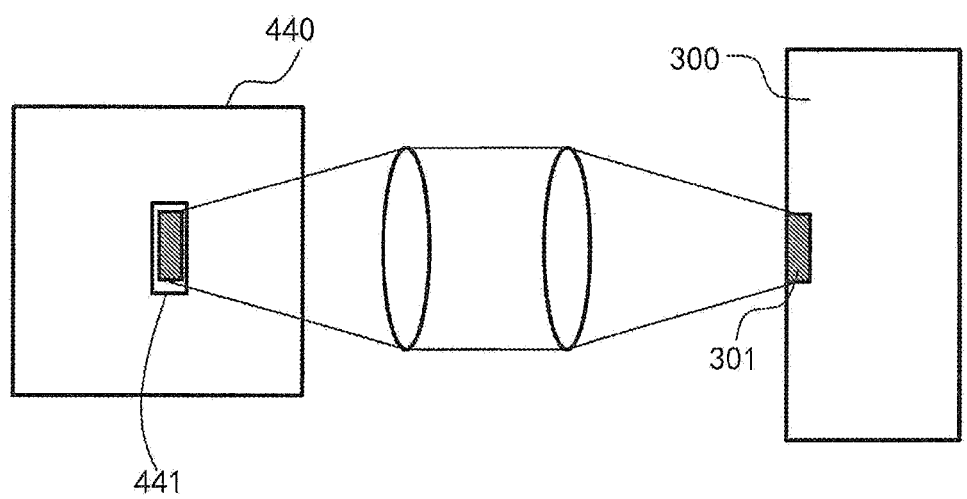
FIG. 18 is an optical path schematic diagram of a signal collected optical path of a laser induced breakdown spectrograph according to another exemplary embodiment.

Reference to FIG. 18, the FIG. 18 representatively shows a schematic diagram of an optical path of a laser induced breakdown spectrograph 300 capable of embodying the principles of the present disclosure. In the exemplary embodiment, the structure and function of the laser induced breakdown spectrograph 300 provided by the present disclosure are substantially the same as those of the laser induced breakdown spectrograph 300 described above, but the differences are as follows.

As shown in FIG. 18, in the present embodiment, the spectrograph 440 for spectral analysis does not adopt the optical fiber spectrograph 340. The incident end of the spectrograph 440 is provided with an incident slit 441 which corresponds to the position of the light spot concentrated on the substance 200 to be tested and which has the same extending direction with the light spot. That is, in the present embodiment, the transmission path of the plasma signal source 301 (that is, the light spot)→the lens 430→the incident slit 441 of the photons on the surface of the substance 200 to be tested is the signal acquisition path. Based on the above design, the original fiber bundle is removed, and a signal acquisition optical path based on free space coupling is formed. In the embodiment, when the technical solution provided by the embodiment is adopted, the photons emitted by the light spot of the substance 200 to be tested can be maximally received by the spectrograph 440, and the laser induced breakdown spectrograph 300 has high acquisition efficiency.

Although the present disclosure has been described with reference to several typical embodiments, it should be understood that the terms used are illustrative and rather than restrictive. Since the present disclosure can be implemented in various forms without departing from the spirit or essence of the present disclosure, it should be understood that the above-mentioned embodiments are not limited to any of the foregoing details, but should be interpreted extensively within the spirit and scope defined by the appended claims. Therefore, all changes and modifications falling within the claims or their equivalents shall be covered by the appended claims.

What is claimed is:

1. A vibration optical path assembly, configured for light to pass through and forming a light spot, comprising:
   an optical platform;
   a cantilever, at least comprising a vertical arm disposed at the optical platform and a cross arm disposed at the vertical arm, wherein at least one of the vertical arm and the cross arm is made of an elastic material;
   a vibration generating device, provided on the cantilever and configured to adjustably generate a first vibration; and
   an optical lens, provided on the cantilever and configured for the light to pass through to form the light spot;
   wherein the first vibration is transmitted to the optical lens through the cantilever to generate a second vibration, and the light is passed through the optical lens with vibrating to generate a light spot movement phenomenon.

2. The vibration optical path assembly according to claim 1, the vertical arm is perpendicular to the optical platform, the cross arm is parallel to the optical platform, a top part of the vertical arm is connected to a middle position of the cross arm in an extending direction of the cross arm; the vibration generating device and the optical lens are respectively disposed at positions adjacent to two end parts of the cross arm; and the cross arm is made of the elastic material.

3. The vibration optical path assembly according to claim 2, the vertical arm is made of the elastic material.

4. The vibration optical path assembly according to claim 2, a light incident direction of the light parallel to the optical platform is defined, directions of the first vibration and the second vibration are both perpendicular to the optical platform and perpendicular to the light incident direction, or directions of the first vibration and the second vibration are both parallel to the optical platform and perpendicular to the light incident direction.

5. The vibration optical path assembly according to claim 1, the vertical arm is perpendicular to the optical platform, the cross arm is disposed at one side of the vertical arm and parallel to the optical platform, a light incident direction of the light parallel to the optical platform is defined, the cross arm is perpendicular to the light incident direction, the optical lens is disposed at the vertical arm, and the cross arm and the vertical arm are made of elastic materials.

6. The vibration optical path assembly according to claim 5, a direction of the first vibration is perpendicular to the optical platform and perpendicular to the light incident direction, and a direction of the second vibration is parallel to the optical platform and perpendicular to the light incident direction.

7. The vibration optical path assembly according to claim 5, the optical lens is disposed at the top part of the vertical arm.

8. The vibration optical path assembly according to claim 5, the cross arm is disposed at the middle position of the vertical arm in a height direction of the vertical arm to which the cross arm is connected.

9. The vibration optical path assembly according to claim 5, the optical lens is disposed at a side of the vertical arm to which the cross arm is connected; or the optical lens is disposed at an opposite side of the vertical arm to which the optical lens is connected.

10. The vibration optical path assembly according to claim 1, the top part of the vertical arm is connected to the middle position of the cross arm in the extending direction of the cross arm, and the vibration generating device and the optical lens are respectively disposed at positions adjacent to the two end parts of the cross arm; wherein an titling angle is provided between the cross arm and the optical platform, and the cross arm is made of the elastic material.

11. The vibration optical path assembly according to claim 10, the vertical arm is made of the elastic material.

12. The vibration optical path assembly according to claim 1, the vertical arm comprises a first arm and a second arm which are perpendicular to the optical platform, the first arm is disposed at the optical platform, and the second arm is configured to adjustably move up and down relative to the first arm in a direction perpendicular to the optical platform, the second arm is connected to the middle position of the cross arm in the extending direction of the cross arm, the vibration generating device and the optical lens are respectively disposed at positions adjacent to the two end parts of the cross arm, and the cross arm is made of the elastic material.

13. The vibration optical path assembly according to claim 12, the first arm is provided with a first positioning structure, and the second arm is provided with a second positioning structure that is cooperated with the first positioning structure to position the second arm and the first arm with each other when the second arm is adjusted to a different position relative to the first arm.

14. The vibration optical path assembly according to claim 12, the first arm and the second arm are respectively rotatable relative to each other.

15. The vibration optical path assembly according to claim 12, the cross arm comprises a body part and a connection part; the connection part is connected to the middle position of the body part in the extending direction of the body part and extended to the second arm; the body part of the cross arm is connected to the second arm via the connection part.

16. The vibration optical path assembly according to claim 1, the vertical arm is provided with a third positioning structure, and the optical platform is provided with a plurality of sets of fourth positioning structures for positioning the vertical arm and the optical platform when the cantilever is adjusted to different positions of the optical platform.

17. The vibration optical path assembly according to claim 1, at least one of the vertical arm and the cross arm of the cantilever is designed as reed.

18. The vibration optical path assembly according to claim 1, the vibration generating device is a button type vibration generator.

19. A laser induced breakdown spectrograph, configured for spectral analysis of a substance to be tested, comprising:
    a laser, configured to emit a high energy pulsed laser;
    an vibration optical path assembly, provided between the laser and the substance to be tested to focus the high energy pulsed laser to the substance to be tested to form a light spot; the vibration optical path assembly comprising:
    an optical platform;
    a cantilever, at least comprising a vertical arm disposed at the optical platform and a cross arm disposed at the vertical arm, wherein at least one of the vertical arm and the cross arm is made of an elastic material;
    a vibration generating device, provided on the cantilever and configured to adjustably generate a first vibration; and
    an optical lens, provided on the cantilever and configured for the light to pass through to form the light spot;
    wherein the first vibration is transmitted to the optical lens through the cantilever to generate a second vibration, and the light is passed through the optical lens with vibrating to generate a light spot movement phenomenon;
    a spectrograph, configured to receive photons generated by the high energy pulsed laser bombardment of the substance to be tested and perform spectral analysis; and
    a signal acquisition component, provided between the substance to be tested and the spectrograph to collect photons to the spectrograph.

20. The laser induced breakdown spectrograph according to claim 19, the spectrograph is provided with an incident slit, positions of the incident slit and the light spot are corresponding to each other, and extending directions of the incident slit and the light spot are the same.

\* \* \* \* \*